(12) United States Patent
Kenington et al.

(10) Patent No.: US 9,351,126 B2
(45) Date of Patent: May 24, 2016

(54) METHOD AND APPARATUS FOR DERIVING INDOOR/OUTDOOR CLASSIFICATION INFORMATION

(71) Applicant: Viavi Solutions UK Limited, Berkshire (GB)

(72) Inventors: Peter Kenington, Chepstow (GB); Stefan Thiel, Newbury (GB); Gareth Smith, Berkshire (GB); Michael Joseph Flanagan, Chester, NJ (US)

(73) Assignee: Viavi Solutions UK Limited, Berkshire (GB)

( * ) Notice: Subject to any disclaimer, the term of this patent is extended or adjusted under 35 U.S.C. 154(b) by 107 days.

(21) Appl. No.: 14/141,871

(22) Filed: Dec. 27, 2013

(65) Prior Publication Data

US 2015/0189479 A1 Jul. 2, 2015

(51) Int. Cl.
*H04W 4/04* (2009.01)
*H04W 64/00* (2009.01)
*G01S 5/02* (2010.01)
*G01S 5/00* (2006.01)

(52) U.S. Cl.
CPC ............ *H04W 4/043* (2013.01); *G01S 5/0036* (2013.01); *G01S 5/0252* (2013.01); *H04W 64/00* (2013.01); *H04W 64/003* (2013.01)

(58) Field of Classification Search
CPC .... G01S 5/0252; H04W 4/043; H04W 64/00; H04W 64/003
USPC ........ 455/404.2, 418–422.1, 435.1–453, 509, 455/550.2, 456.1, 456.2, 456.3, 457; 370/329–332, 328, 341, 348
See application file for complete search history.

(56) References Cited

U.S. PATENT DOCUMENTS

2007/0049295 A1* 3/2007 Soliman ................ G01S 5/0252
455/456.3

FOREIGN PATENT DOCUMENTS

WO WO 2007/025151 A2 3/2007

OTHER PUBLICATIONS

Extended European Search Report corresponding to EP 14 19 8678, mailed Jul. 21, 2015, 7 pages.

* cited by examiner

*Primary Examiner* — Babar Sarwar
(74) *Attorney, Agent, or Firm* — Harrity & Harrity, LLP (57) ABSTRACT

A method and apparatus for deriving indoor/outdoor classification information for call data for a wireless communication network. The method comprises identifying a set of subscriber call data records relating to vehicular calls, deriving a physical channel measurement threshold value based at least partly on physical channel measurement values for the subscriber call data records identified as relating to vehicular calls, and classifying subscriber call data records for the wireless communication network as indoor subscriber call data records and outdoor subscriber call data records based at least partly on a comparison of physical channel measurement values for the subscriber call data records with the derived physical channel measurement threshold value.

20 Claims, 7 Drawing Sheets

METHOD AND APPARATUS FOR DERIVING INDOOR/OUTDOOR CLASSIFICATION INFORMATION

FIELD OF THE INVENTION

The field of the invention relates to a method and apparatus for deriving indoor/outdoor classification information, and in particular to method and apparatus for deriving indoor/outdoor classification information for call data for a wireless communication network.

BACKGROUND OF THE INVENTION

Wireless communication networks, such as the $3^{rd}$ Generation (3G) and $4^{th}$ Generation (4G) of wireless telephone standards and technology, are well known. Examples of such 3G and 4G standards and technology are the Universal Wireless Telecommunications System (UMTS™) and the Long Term Evolution (LTE) respectively, developed by the $3^{rd}$ Generation Partnership Project (3GPP™) (www.3gpp.org).

These $3^{rd}$ and $4^{th}$ generations of wireless communications, have generally been developed to support macro-cell wireless phone communications, and more recently femto-cell wireless phone communications. Here the 'phone' may be a smart phone, or another wireless or portable communication unit that is linked wirelessly to a network through which calls etc. are connected. Henceforth all these devices will be referred to as wireless communication units. Calls may be data, video, or voice calls, or a combination of these.

Typically, wireless communication units, or User Equipment (UE) as they are often referred to in 3G parlance, communicate with a Core Network of the 3G or 4G wireless communication network. This communication is via a Radio Network Subsystem. A wireless communication network typically comprises a plurality of Radio Network Subsystems. Each Radio Network Subsystem comprises one or more cells, to which wireless communication units may attach, and thereby connect to the network. A base station may serve a cell. Each base station may have multiple antennas, each of which serves one sector of the cell.

Geolocation is the real-world geographical location of objects, and geolocation of wireless communication units is an increasingly important and desirable service. There are many mechanisms by which users of a wireless communication network may be located, whilst they are using the system. These include use of the global positioning system (GPS), if the wireless device is equipped with a GPS receiver and the user has enabled this on his/her device. However, many users do not enable GPS on their devices as it is typically a significant power drain on the device's battery. Other techniques examine the base-stations which are visible to a user's device and calculate the intersection of the coverage footprints of these base-stations, for example based upon drive-testing or data collected from previous users of the same base-stations who have had GPS enabled on their devices. The assumption is that the user device must be somewhere within the overlap of the coverage areas. Still other techniques measure the timing delay between a user device and a number of local base-stations; the time taken for signals to propagate to each base-station gives an estimate of the distance of the user device from each base-station and hence the combined information from a number of base-stations provides a set of 'contours' which intersect to provide the approximate location of the user.

These known geolocation techniques can work well in relation to wireless devices that are located outdoors. However, it is a much more difficult problem when devices are located indoors due to the attenuating effect of walls etc. GPS signals, for example, will not propagate very far at all within a building meaning that unless the user is located very close to a window, their location cannot be reliably ascertained by this means. Likewise, fewer base-stations will be 'visible' to a user device when the user is indoors, and this can make timing or coverage-overlap based geolocation mechanisms difficult to use. Ascertaining whether a device is located indoors or outdoors would make geolocating a wireless device a simpler process.

The ability to determine whether wireless devices connected to a wireless communication network are located indoors or outdoors would also enable indoor/outdoor wireless traffic patterns to be analysed in order to help plan and configure network coverage and load parameters for the wireless communication network more effectively. In particular, there is increasing focus being placed upon how best to serve indoor users, since a significant number of users spend a significant amount of time using wireless devices indoors, as the traditional land-line telephone is gradually consigned to history. Operators want to ensure that such users are well served and do not place an undue burden on the macro-cell network, which is expensive to expand in terms of additional capacity. Where large densities of indoor users are found, these could be better served by the placement of a small cell within, for example, the building, or outside the building but with antennas directed into the building.

Figure 1:
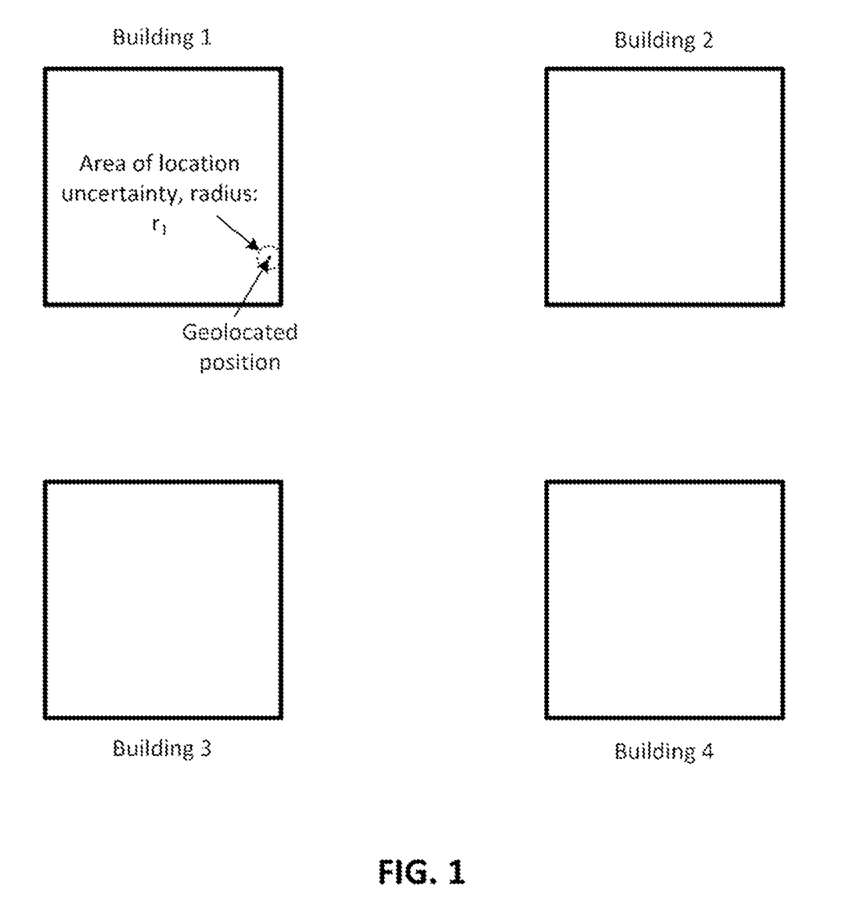
FIG. 1 illustrates a typical indoor geolocation scenario based upon GPS geolocation.

FIG. 1 shows a typical indoor geolocation scenario based upon GPS geolocation. As noted above, GPS is of limited use within a building, only working (if at all) close to a window or similar aperture. A 'radius of location uncertainty' may be defined for a geolocation system. This is the radius of a circle, centred upon the reported location 'fix', within which a user could actually be located: the more accurate the geolocation system, the smaller the radius of location uncertainty, with the radius being zero for a 'perfect' geolocation system. GPS is typically very accurate, with a radius of location uncertainty (r1) of only a few meters under the most favourable operating circumstances (i.e. multiple observed GPS satellites, etc.). With this level of accuracy, it is relatively easy to differentiate between likely indoor and outdoor users simply on the basis of their reported location. GPS is, however, often not available, either through GPS chipsets being turned off inside mobile devices to reduce battery consumption, or due to obstructions caused by tall buildings or through the user being located well within the body of a building.

Figure 2:
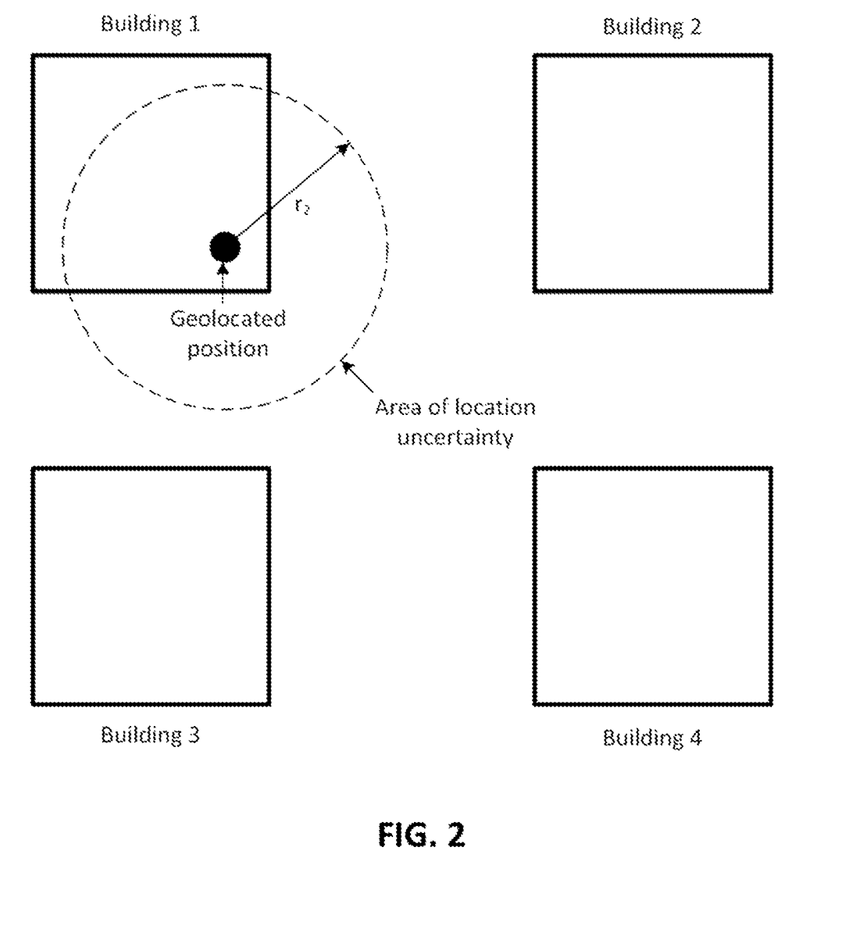
FIG. 2 illustrates a geolocation scenario involving a terrestrial geolocation technique.

FIG. 2 shows a geolocation scenario involving one of the terrestrial geolocation techniques discussed above. For the purposes of this discussion, it does not matter which technique is being used, only that the radius of uncertainty, r2, is sufficiently large that the user could conceivably be located within or outside of a building and the geolocation system (unaided) is unable to distinguish between the two scenarios. The typical accuracy of a good terrestrial geolocation system, based upon a cellular telephone network (say), is around 100 m (i.e. r2=100 m) or greater. This is clearly insufficient to reliably place a user within or outside of a typical building.

SUMMARY OF THE INVENTION

Accordingly, the invention seeks to mitigate, alleviate or eliminate one or more of the abovementioned disadvantages singly or in any combination.

According to a first aspect of the present invention, there is provided a method of deriving indoor/outdoor classification information for call data for a wireless communication network. The method comprises identifying a set of subscriber call data records relating to vehicular calls, deriving a physical channel measurement threshold value based at least partly on physical channel measurement values for the subscriber call data records identified as relating to vehicular calls, and classifying subscriber call data records for the wireless communication network as indoor subscriber call data records and outdoor subscriber call data records based at least partly on a comparison of physical channel measurement values for the subscriber call data records with the derived physical channel measurement threshold value.

In this manner, characteristics that enable vehicular devices to be identified such as, for example, the rate of change of location for such devices may be used to identify a set of outdoor subscriber call data records (i.e. the set of vehicular subscriber call data records). A physical channel measurement threshold value may then be derived based on real world physical channel measurement values for those outdoor subscriber call data records corresponding to real world conditions for the outdoor devices, which is then used to derive indoor/outdoor classification information for call data more generally.

It should be noted that the term "subscriber call data records" as used herein refers to a call data records generated from call data for actual users/subscribers of the wireless communication network, as opposed to data generated from artificial drive test data collection entities. The use of such subscriber call data records enables continuously replenishing data to be used that is produced by ordinary subscribers making ordinary use of the communication network, whilst avoiding the need for prohibitively expensive drive testing to be performed.

In some optional embodiments, the method may comprise deriving location specific physical channel measurement threshold values based at least partly on physical channel measurement values for the subscriber call data records identified as relating to vehicular calls. For example, the method may comprise deriving physical channel measurement threshold values for each of a plurality of area bins of a coverage area of the wireless communication network; each physical channel measurement threshold value being derived based at least partly on physical channel measurement values for subscriber call data records identified as relating to vehicular calls located within the corresponding area bin.

In some optional embodiments, deriving the physical channel measurement threshold value may comprise retrieving physical channel measurement values for the set of subscriber call data records identified as relating to vehicular calls, calculating mean and standard deviation values for the retrieved physical channel measurement values for the set of subscriber call data records identified as relating to vehicular calls, and deriving the physical channel measurement threshold value based at least partly on the calculated mean and standard deviation values.

In some optional embodiments, deriving the physical channel measurement threshold value may further comprise determining a theoretical physical channel measurement value based at least partly on a standard path-loss model, and deriving the physical channel measurement threshold value further based on the theoretical physical channel measurement value.

In some optional embodiments, deriving the physical channel measurement threshold value may further comprise determining whether a sufficient quantity of physical channel measurement values for the set of subscriber call data records identified as relating to vehicular calls is available, and deriving the physical channel measurement threshold value based solely on the theoretical physical channel measurement value if it is determined that an insufficient quantity of physical channel measurement values for the set of subscriber call data records identified as relating to vehicular calls is available.

In some optional embodiments, the method may further comprise determining whether a subscriber call data record relates to a vehicular call, and classifying the subscriber call data record as an outdoor subscriber call data record if it is determined that the subscriber call data record relates to a vehicular call.

In some optional embodiments, the method may further comprise classifying the subscriber call data record as an outdoor data call if it is determined that the subscriber call data record does not relate to a vehicular call, and a physical channel measurement value for the subscriber call data record exceeds the derived physical channel measurement threshold value.

In some optional embodiments, the method may further comprise classifying the subscriber call data record as an indoor data call if it is determined that the subscriber call data record does not relate to a vehicular call, and the physical channel measurement for the subscriber call data record does not exceed the derived physical channel measurement threshold value.

In some optional embodiments, determining whether a particular subscriber call data record relates to a vehicular call may comprise retrieving subscriber call data records for a wireless device to which the particular subscriber call data record relates corresponding to a travel time window, obtaining geolocation data for the retrieved data records, determining a distance traveled by the wireless device over the travel time window based at least partly on the obtained geolocation data, and determining whether the particular subscriber call data record relates to a vehicular call based at least partly on the determined distance traveled within the travel time window.

According to a second aspect of the present invention, there is provided an apparatus for deriving indoor/outdoor classification information for call data for a wireless communication network. The apparatus comprises at least one data processing component arranged to: identify a set of subscriber call data records relating to vehicular calls, derive a physical channel measurement threshold value based at least partly on physical channel measurement values for the subscriber call data records identified as relating to vehicular calls, and classify subscriber call data records for the wireless communication network as indoor subscriber call data records and outdoor subscriber call data records based at least partly on a comparison of physical channel measurement values for the subscriber call data records with the derived physical channel measurement threshold value.

According to a third aspect of the present invention, there is provided a non-transitory computer program product having computer-readable code stored thereon for programming a data processing module to perform the method of the first aspect of the present invention.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Examples of the invention will be described in terms of a system and a method for deriving indoor/outdoor classification information for call data for a wireless communication network, such as a network implemented in accordance with the $3^{rd}$ Generation (3G) and/or $4^{th}$ Generation (4G) of wireless telephone standards and technology. Examples of such 3G and 4G standards and technology is the Universal Wireless Telecommunications System (UMTS™) and Long Term Evolution (LTE), developed by the $3^{rd}$ Generation Partnership Project (3GPP™) (www.3gpp.org).

In some examples, there is described a method and apparatus therefor, the method comprising identifying a set of subscriber call data records relating to vehicular calls, deriving a physical channel measurement threshold value based at least partly on physical channel measurement values for the subscriber call data records identified as relating to vehicular calls, and classifying subscriber call data records for the wireless communication network as indoor subscriber call data records and outdoor subscriber call data records based at least partly on a comparison of physical channel measurement values for the subscriber call data records with the derived physical channel measurement threshold value.

Figure 3:
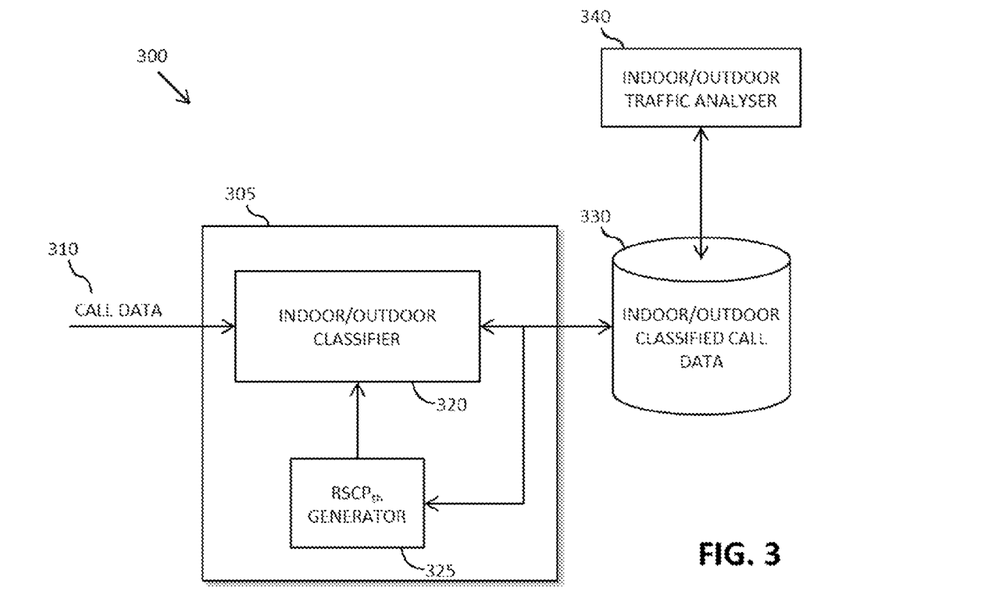
FIG. 3 illustrates a simplified block diagram of an example of an apparatus for deriving indoor/outdoor classification information for call data for a wireless communication network.

Referring first to FIG. 3, there is illustrated a simplified block diagram of an example of an apparatus 300 for deriving indoor/outdoor classification information for call data for a wireless communication network. The apparatus 300 may be implemented in any suitable manner. For example, and as illustrated in FIG. 3, the apparatus 300 may be implemented by way of computer program code, and arranged to be executed on one or more data processing modules, such as the data processing module illustrated generally at 305. The computer program code may be stored within one or more non-transitory computer program products, for example such as one or more memory element(s). Such memory element(s) may comprise any form of computer-readable storage device, such as a hard disc, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

In the illustrated example, the apparatus 300 is arranged to receive call data 310 for one or more wireless communication networks, such as one or more 3G and/or 4G networks, and comprises an indoor/outdoor classifier module 320 arranged to derive indoor/outdoor classification information for the received call data 310, such as described in greater detail below. The indoor/outdoor classification information may then be output to, for example, one or more data storage devices, such as the data storage device illustrated generally at 330. The indoor/outdoor classification information may subsequently be accessed by, for example, an indoor/outdoor traffic analyser 340 or the like.

The call data 310 may be received from one or more components of the, or each, wireless communication network such as, say, the Operations Support System (OSS) (not shown) of the, or each, wireless communication network. Additionally/alternatively, the call data may be obtained from a data storage device; such a data storage device may be the same data storage device 330 within which the indoor/outdoor classification information is stored, or it may be a different data storage device.

In accordance with some example embodiments of the present invention, the received call data 310 may be divided into three categories: vehicular, non-vehicular or unknown vehicular status. Vehicular call data may be defined as call data relating to wireless communication devices whose velocity at the movement of the respective call event exceeds a given threshold (say 3 m/s, ~7 mph). This may be determined by the rate of change of position of the device, for example as derived from successive geolocation 'fixes' on the device. Where call data is classified as 'vehicular', it may be assumed to be outdoors (in the absence of other a priori information).

Those skilled in the art will recognize that physical channel measurement values for vehicular call data, for example such as RSCP values or and Ec/Io values, may be used as the basis for deriving a physical channel measurement threshold value that enables call data other than vehicular call data to be classified as indoor or outdoor.

For example, a mean RSCP value (or other mean physical channel measurement value) and a standard deviation RSCP value (or other mean physical channel measurement value) may be calculated for vehicular call data. These mean and standard deviation values may then be used to define a range of, in this example, RSCP values for which it is likely that a call event is originating from outdoors. In other words, if a new call is tracked for a non-vehicular user, and the RSCP value falls within such a defined 'outdoor' range, then it may be assumed that this new call is taking place outdoors. Conversely, if the RSCP value falls outside such a defined 'outdoor' range, then the call may be deemed to be taking place indoors.

In accordance with some example embodiments of the present invention, for call data for which no physical channel measurement information (e.g. RSCP, Ec/Io, etc.) is available and which has not been classified as vehicular call data, such call data collectively may be classified as 'indoor' and 'outdoor in proportion to the indoor/outdoor distribution of call data classified based on whether the call data is vehicular and/or based on the physical channel measurement information therefor as described above. If, for example, 50% of classified call data in a given area has been classified as being indoors and the remaining 50% as outdoors, then the call data for which no physical channel measurement information is available may also be (arbitrarily) classified as 50% indoor and 50% outdoor. In this way, a complete traffic map may be built up, with indoor and outdoor traffic identified to a sufficiently high degree of accuracy. Note that it is not necessary for the division of traffic between 'indoor' and 'outdoor' to be perfect on a measurement sample by measurement sample basis, since we are not, generally, concerned with details of any one noisy sample, but are concerned with the aggregate indoor/outdoor classification that can be determined across a plurality of measurement samples. This indoor/outdoor classification information may subsequently be used for decisions about whether to deploy specific additional (small or femto) cells to provide enhanced indoor coverage/capacity, based upon the actual habits of real users in that specific location. Since the cost of deploying a small cell is high, it is most cost efficient to only deploy such cells where they are of genuine benefit (and remove significant traffic from a macrocell, for example), rather than based upon guesswork informed only by a few 'typical' network examples.

Figure 4:
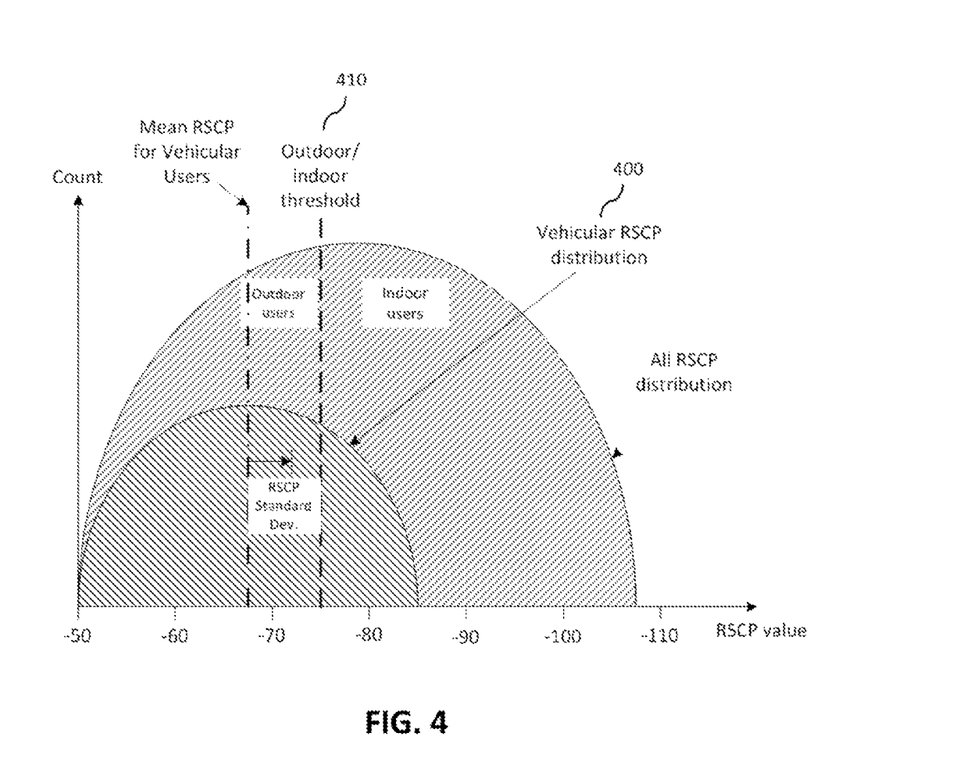
FIG. 4 illustrates a simplified example of a typical RSCP measurement distribution for a cell sector of a wireless communication network.

FIG. 4 illustrates a simplified example of the typical RSCP measurement distribution for a cell sector of a wireless communication network. It can be seen that the vehicular RSCP distribution, indicated generally at 400, occupies the upper end of the distribution of all RSCP values. This occurs because outdoor users (which vehicular users typically are) generally enjoy a better signal strength than indoor users, due to the lack of intervening walls and ceilings, which attenuate radio signals.

An outdoor/indoor RSCP threshold value 410 may be set at a value such that the majority of vehicular users (based upon their RSCP values) are incorporated in the 'outdoor' category. The indoor users can therefore be classified as any users experiencing a poorer RSCP value than this threshold, i.e. lying to the right of the threshold line 410 in FIG. 4.

Figure 5:
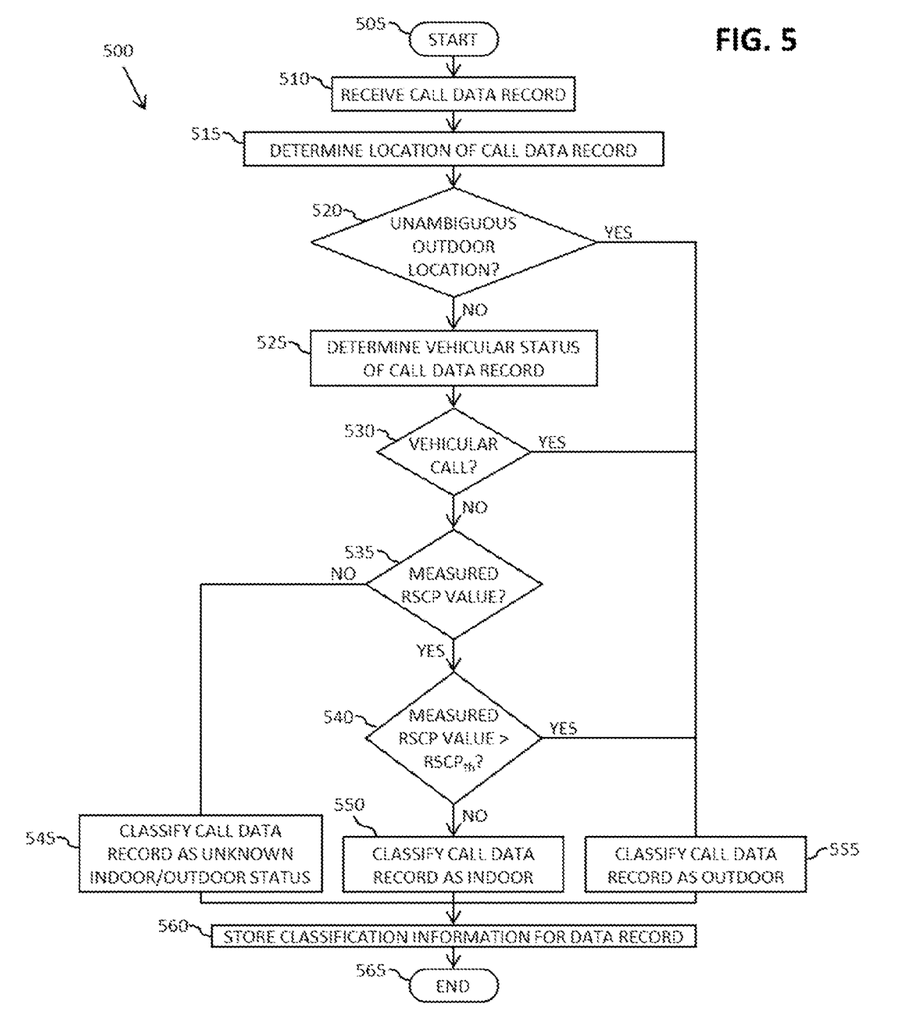
FIGS. 5 to 7 illustrate simplified flowcharts of parts of an example of a method of deriving indoor/outdoor classification information for call data for a wireless communication network.
Figure 6:
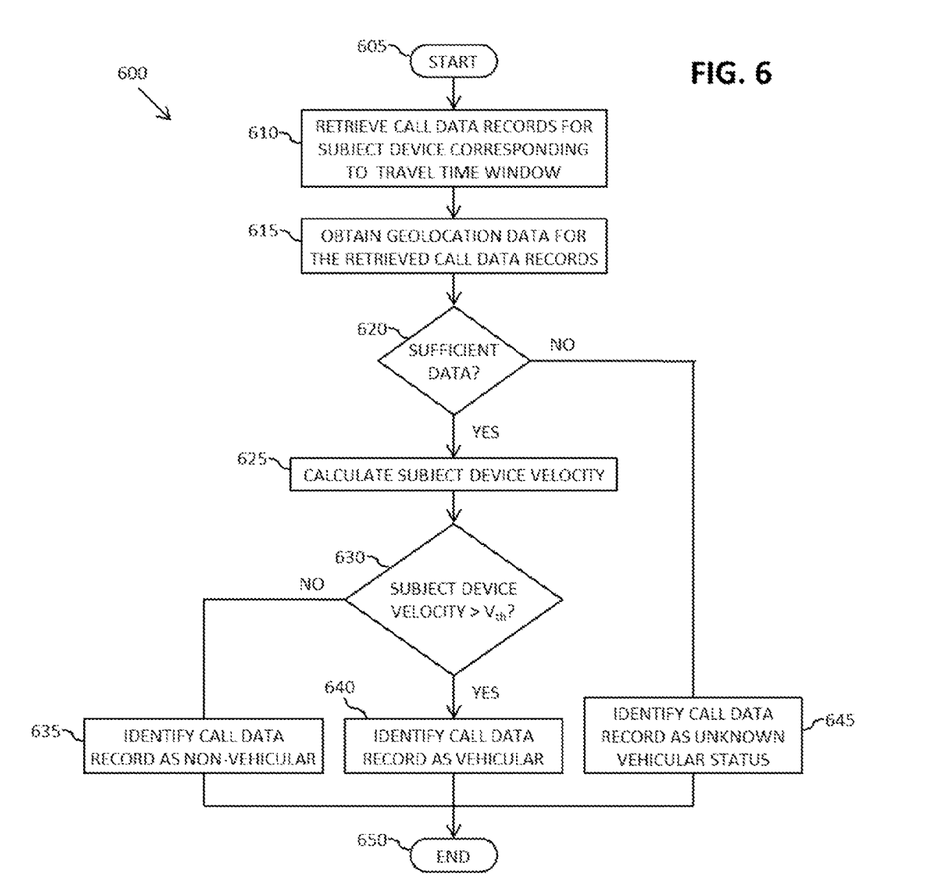
Figure 7:
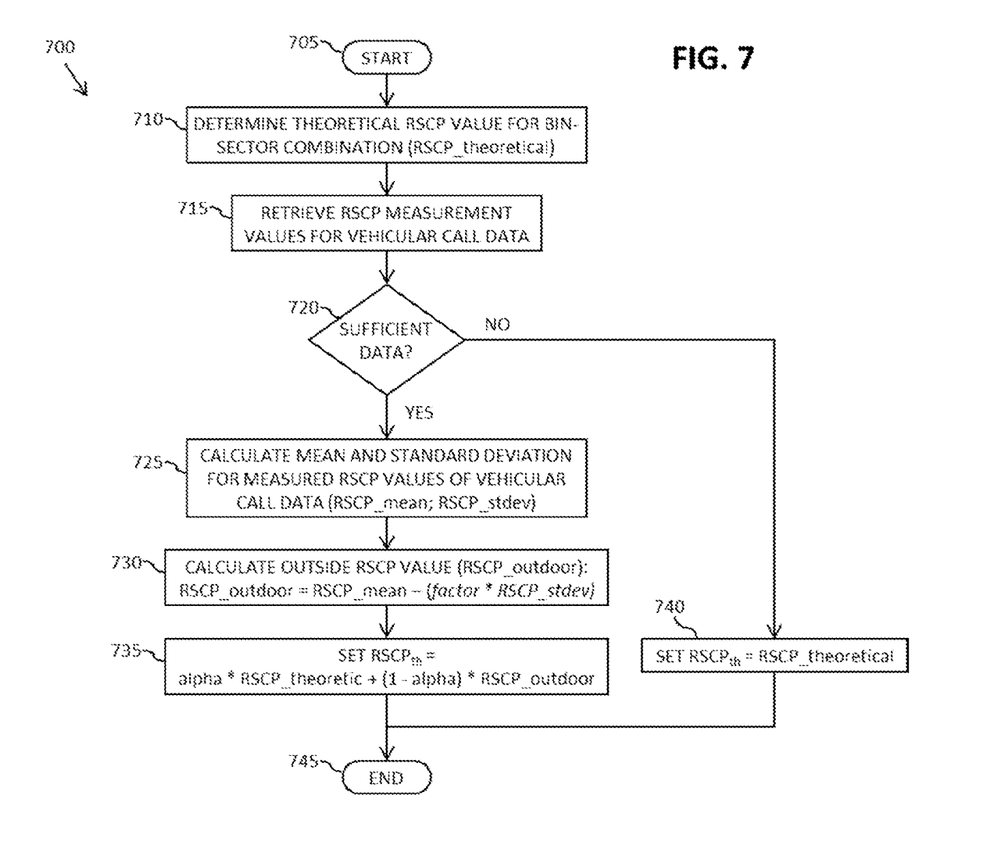

Referring now to FIGS. 5 to 7, there are illustrated simplified flowcharts 500, 600, 700 of parts of an example of a method of deriving indoor/outdoor classification information for call data for a wireless communication network, such as may be implemented by the apparatus 300 of FIG. 3. Referring first to FIG. 5, the method starts at 505 and moves on to 510 where a subscriber call data record is received, the subscriber call data record comprising data relating to at least a part of a single call within the wireless communication network. It will be appreciated that a call may be a data, video, or voice call, or a combination of these. In the illustrated example, upon receipt of the subscriber call data record, the method comprises determining a location for the call event to which the subscriber call data record relates, at 515. For example, the subscriber call data record may comprise geolocation information. Such geolocation information may be based upon GPS (global positioning system) information provided by the respective wireless communication device, or may have been derived using terrestrial geolocation techniques.

Having determined a location for the call event, the method of the illustrated example comprises determining whether the call event to which the subscriber call data record relates occurred at an unambiguously outdoor location, at 520. For example, if the call event is (geo)located at a point which is unambiguously outdoors (e.g. because there are no buildings around, such as in a park or rural location) and all of the 'area of uncertainty' (as defined by the radius of location uncertainty) of that location estimate is also obviously outdoors (e.g. the area of uncertainty covers only the park/rural location and does not overlap any buildings) then it may be determined that the call event occurred at an "unambiguously outdoor location". If it is determined that the call event to which the subscriber call data record relates occurred at an unambiguously outdoor location, then the subscriber call data record may be classified as outdoor, at 555, and the method ends.

However, as outlined in the background of the invention, it is not always possible to unambiguously determine whether a user device is located outdoors, in particular when geolocation information has been derived using terrestrial geolocation techniques. Accordingly if, at 520, it is determined that the subscriber call data record is not located at an unambiguously outdoor location, then the method of the illustrated example moves on to 525 where a vehicular status of the subscriber call data record is determined (i.e. whether the wireless communication device involved in the call event to which the subscriber call data record relates was within a moving vehicle at the time of the call event).

According to some examples of the present invention, a wireless communication device may be determined to be located within a vehicle based upon a rate of change of location for that wireless communication device (i.e. a perceived velocity therefor). For example, subscriber call data records may be given a vehicular status if a perceived velocity for the respective wireless communication device at the time of the respective call event is greater than, say, 3 m/s. Conversely, subscriber call data records may be given a vehicular status if a perceived velocity for the respective wireless communication device at the time of the respective call event is less than, in this example, 3 m/s.

FIG. 6 illustrates such an example of a method for determining whether a subscriber call data record relates to a vehicular call, as may be performed at step 525 of FIG. 5. The method of FIG. 6 starts at 605, and moves on to 610 where subscriber call data records for the wireless communication device involved in the call event to which the subscriber call data record relates (the "subject device") corresponding to a travel time window are retrieved, for example from call record storage facility (not shown). The travel time window comprises a period of time of any suitable duration, within which the call event to which the subscriber call data record relates occurred. The duration of the travel time window should be sufficiently long to enable enough data to be available (e.g. enough subscriber call data records for the subject device to be available) for calculating the velocity of the subject device, whilst being sufficiently short to ensure the available data is valid for determining the velocity of the subject device for the point in time at which the call event to which the subscriber call data record relates occurred. For example, a travel time window of, say, only a few seconds may result in their being an insufficient number of data call records available for the subject device to calculate the subject device velocity. Conversely, a travel time window of, say, an hour or more may result in subscriber call data records that are not relevant to the appropriate period in time being relied upon or involve periods of both vehicular and non-vehicular use, hence rendering a single vehicular vs non-vehicular decision moot.

Having retrieved the subscriber call data records at 610, geolocation data for the retrieved subscriber call data records is obtained, at 615. Such geolocation data for a subscriber call data record may be obtained by way of GPS coordinates provided by the subject device at the time of the call data event; such GPS coordinates being contained within the respective subscriber call data record, or otherwise associated with the subscriber call data record. Alternatively, such geolocation data for a subscriber call data record may be obtained using, for example, one or more terrestrial geolocation techniques. Having obtained the geolocation data for the retrieved subscriber call data records, the method moves on to 620 where it is determined whether sufficient data is available within which to determine a velocity for the subject device. If it is determined that there is insufficient data to determine the velocity for the subject device, in the illustrated example the method moves on to 645 where the subscriber call data record is identified as having an unknown vehicular status, and the method ends at 650. However, if it is determined that there is sufficient data to determine the velocity for the subject device, the method moves on to 625 where the velocity for the subject device is calculated based on the geolocation data for the subject device. The calculated velocity for the subject device is then compared to a threshold velocity value at 630, such as, say, 3 m/s in the above example. If the calculated velocity for the subject device is greater than the threshold velocity, it is determined that the subject device was travelling in a vehicle at the time of the call event and the method moves on to 640 where the subscriber call data record is identified as having a vehicular status. Conversely, if the calculated velocity for the subject device is less than the threshold velocity, the method moves on to 635 where, for the purposes of this example of the present invention, the subscriber call data record is identified as having a non-vehicular status. The method then ends at 650.

Referring back to FIG. 5, if it is determined that the subscriber call data record relates to a vehicular call (e.g. is identified as having a vehicular status in the example method of FIG. 6), at 530, then since vehicles generally travel outdoors it may be assumed that the call event to which the subscriber call data record relates occurred outdoors (i.e. not within a building, albeit within a vehicle). Accordingly, in the illustrated example the subscriber call data record may be classified as outdoor, at 555, and the method ends.

However, if it is determined that the subscriber call data record does not relate to a vehicular call, or if the vehicular status of the subscriber call data record could not be determined, the method of the illustrated example moves on to 535 where it is determined whether a physical channel measurement value is available for the subscriber call data record, such as a RSCP (received signal code power) value or Ec/Io value (the ratio of the received energy per PN chip for the respective channel to the total received power spectral density). In some examples, the subscriber call data record may contain such a physical channel measurement for one or more cell sector(s) visible to the wireless communication device at the time of the call event to which the subscriber call data record relates.

In the illustrated example, if no such physical channel measurement values are available at 535, and since the subscriber call data record has not been determined as being unambiguously outdoor (at 520) or relating to a vehicular call, the subscriber call data record is classified as having an unknown indoor/outdoor status at 545. The classification information for the subscriber call data record is then stored at 560, and the method ends at 565.

However, if at least one physical channel measurement value is available at 535, the method of the illustrated example moves on to 540 where the (at least one) physical channel measurement value is compared to a physical channel measurement threshold value. It is contemplated that the (at least one) physical channel measurement value may be compared to a location specific physical channel measurement threshold value; the location specific physical channel measurement threshold value corresponding to the location for the call event to which the subscriber call data record relates, determined at 515. For example, an area covered by the wireless communication network may be divided into area 'bins', each area bin having a dimension of, say, 50 meters on each side. A physical channel measurement threshold value may be derived for each area bin, and the (at least one) physical channel measurement value may be compared to the physical channel measurement threshold value for the bin within which the call event to which the subscriber call data record relates is located. If the (at least one) physical channel measurement value for the subscriber call data record exceeds the physical channel measurement threshold value, the subscriber call data record is classified as outdoor, at 555. The classification information for the subscriber call data record is then stored at 560, and the method ends at 565. Conversely, if the (at least one) physical channel measurement value for the subscriber call data record does not exceed the physical channel measurement threshold value, the subscriber call data record is classified as indoor, at 550. The classification information for the subscriber call data record is then stored at 560, and the method ends at 565.

Thus, FIGS. 5 to 7 illustrate a method in which subscriber call data records for a wireless communication network may be classified as indoor subscriber call data records and outdoor subscriber call data records based at least partly on a comparison of physical channel measurement values (e.g. RSCP and/or Ec/Io values) for the subscriber call data records with a physical channel measurement threshold value derived from physical channel measurement values for vehicular subscriber call data records.

It should also be noted that the "absence" of physical channel measurements can also provide information about the potential for the call event to which the subscriber call data record relates being indoors. For example, being inside a building may result in a smaller number of base stations being seen (compared to being outdoors). This increases the probability that a wireless communication device without (or with few) physical channel measurements over time could be identified as being indoors, especially when compared to, say, a typical frequency of physical channel measurements for a vehicular wireless communication device within the same vicinity (e.g. located in the same area bin). Thus, it is contemplated that further differentiation of subscriber call data records may be performed at step 545 in FIG. 5, or further (post-)processing performed, of this "unknown indoor/outdoor status" call data records based on such additional information. In particular, and as just described, the absence of physical channel measurements may be a leading indicator (but not a perfect guarantee) that the respective wireless communication device is indoors.

Referring now to FIG. 7, there is illustrated a simplified flowchart 700 of an example of a method for deriving a physical channel measurement threshold value, such as may be implemented by the $RSCP_{th}$ generator 325 illustrated in FIG. 3. In accordance with some examples of the present invention, and as mentioned above, an area covered by the wireless communication network may be divided into area 'bins', with each area bin typically being associated with multiple base-stations/sectors seen by wireless communication devices located in the respective area bin (an individual device will typically 'see' a number of base-stations/sectors, although will not be actively communicating via all of them). A set of physical channel measurement threshold values may be derived for each area bin; the set comprising a physical channel measurement threshold value for each base-station/sector associated with the respective area bin. As such, in step 540 of the example method illustrated in FIG. 5, the (at least one) physical channel measurement value may be compared to a physical channel measurement threshold value for the respective base-station/sector to which the physical channel measurement value relates within the set of physical channel measurement threshold values for the area bin corresponding to the location of the subscriber call data record (e.g. as determined at 515).

Referring back to FIG. 7, this example method for deriving a physical channel measurement threshold value starts at 705 and moves on to 710 where for the illustrated example a theoretical physical channel measurement value, which in the illustrated example comprises a theoretical RSCP value, is determined for each bin-sector combination. For example, the theoretical physical channel measurement value for the bin-sector combination may be calculated from a standard path-loss (signal strength degradation with distance from the transmitter) model for the type of environment within that bin (e.g. rural, suburban, urban etc.). Such a model may simply define that at a given distance from the transmitter (with a given antenna type, power level etc.), in the specific environment in which the user is located (e.g. urban), the theoretically-expected signal level (expressed as an RSCP value in the illustrated example) within that area bin location would be RSCP_theoretical.

Next, at 715, physical channel measurement values from vehicular call data corresponding to the area bin/sector combination are retrieved, for example from the storage device 330 in the example illustrated in FIG. 3. In the illustrated example it is then determined whether sufficient data is available for calculating meaningful mean and standard deviation values from the retrieved physical channel measurement values, at 720. If it is determined that insufficient data is available for calculating meaningful mean and standard deviation values, for example if less than, say, ten physical channel measurement values are available, the method moves on to 740 where the physical channel measurement threshold value for the area bin/sector combination is derived based on the calculated theoretical value.

In this case, the assumption is that if the physical channel measurement value for a data record is poorer than that which would have been expected from the theoretical calculation, then the user is likely to be located indoors. If, on the other hand, the physical channel measurement value for a data record is better than the theoretical value, then the user is probably located outdoors.

In the illustrated example, the physical channel measurement threshold value is illustrated as being set as equal to the theoretical value, based upon a standard path loss model. In some scenarios, this could be considered to be too pessimistic with regard to indoor users. There are many reasons why a physical channel measurement value could be lower than that predicted from a path-loss model, such as shadowing by a local object (e.g. a van or a bus). It may therefore be beneficial to modify this default (theoretical) threshold value to ensure that small negative deviations do not automatically place the user indoors. One example of a modified default (theoretical) threshold value for step 740 may comprise:

$$RSCP\_threshold = RSCP\_theoretic - allowance \quad [\text{Equation 1}]$$

where allowance is a factor which takes account of the likely deviation from the theoretical case experienced in a given environment or specific type of location (e.g. busy road with lots of traffic vs quiet road with little traffic, with all other factors, e.g. urban vs suburban, being equal). It should be noted that RSCP_theoretic and allowance may vary on a bin-by-bin basis.

Referring back to 720, if it is determined that sufficient data is available for calculating meaningful mean and standard deviation values, for example if more than, say, ten physical channel measurement values are available, the method moves on to 725 where the mean and standard deviation for the physical channel measurement values retrieved at 715 are calculated.

Next, at 730, an outside physical channel measurement value (RSCP_outside) for the area bin/sector combination is calculated based on the mean and standard deviation values calculated at 725. For example, the outside physical channel measurement value (RSCP_outside) may be calculated based on:

$$RSCP\_outside = RSCP\_mean - factor * RSCP\_stdev \quad [\text{Equation 2}]$$

where factor is a small non-negative value (for example factor=1). The value for factor may be derived by means of a known sample set. For example, a given location, or a number of locations, is/are carefully measured and RSCP values recorded for both indoor users and outdoor users (together with their locations, based upon actual map locations, say, rather than any automated geolocation technique—although GPS could be used where suitable coverage exists). This 'real', carefully measured data may then be modelled as if it was normal network data and the model 'fitted' to the real data by adjusting the value of factor to provide the best fit, given that it is known for certain whether the users, captured in the sample data set, were indoors or outdoors at any given point in time.

The physical channel measurement threshold value for the area bin/sector combination may then be derived based on the calculated outside physical channel measurement value (RSCP_outside) therefor, at 735. In the illustrated example, the physical channel measurement threshold value is derived based upon:

$$RSCP\_threshold = alpha * RSCP\_theoretic + (1 - alpha) * RSCP\_outside \quad [\text{Equation 3}]$$

with alpha=[0;1], for example alpha=0.5. The value chosen for alpha in Equation 3 determines the relative weight given to the theoretical propagation model vs that given to the typical physical channel measurement values from the users who are 'known' to be outside (e.g. due to them being in vehicles).

Having derived the physical channel measurement threshold value, the method ends, at 745.

Advantageously, the example method illustrated in FIG. 7 comprises deriving physical channel measurement threshold values for individual area bins of a coverage area of the wireless communication network; each physical channel measurement threshold value being derived based at least partly on physical channel measurement values for subscriber call data records identified as relating to vehicular calls located within the corresponding area bin. By deriving the physical channel measurement threshold values on such a "bin-by-bin" basis using physical channel measurement values for subscriber call data records relating to vehicular calls also organised on such a "bin-by-bin" basis, the distinctive geographically-varying radio properties of the wireless communication network can be taken into consideration.

In the example method illustrated in FIG. 7, physical channel measurement threshold values are calculated based on mean and standard deviation values for the physical channel measurement values from vehicular call data corresponding to the area bin/sector combination. However, it will be appreciated that physical channel measurement threshold values may additionally/alternatively be calculated based on other statistical techniques such as, say, a percentile approach based on observed/estimated cumulative distribution functions, etc.

Referring back to FIG. 3, the classification information for the call data is stored within the storage device 330, and subsequently accessed by, for example, the indoor/outdoor traffic analyser 340. For example, for each area bin/sector combination, the indoor/outdoor traffic analyser 340 may be arranged to sum the traffic classified as being outdoor (CT_outdoor) and sum the traffic that has been classified as being indoor (CT_indoor). These values may then be used to derive a ratio of outdoor traffic to indoor traffic (CT_outdoor: CT_indoor). This ratio may then be used to provide, say, a traffic map for each area bin and/or area bin/sector combination, indicating the relative proportion of traffic that is outdoor and indoor. Additionally/alternatively, the ratio of outdoor traffic to indoor traffic (CT_outdoor:CT_indoor) may be used to allocate call data classified as having an unknown indoor/outdoor status between outdoor and indoor to enable total outdoor traffic and total indoor traffic values to be derived.

Figure 8:
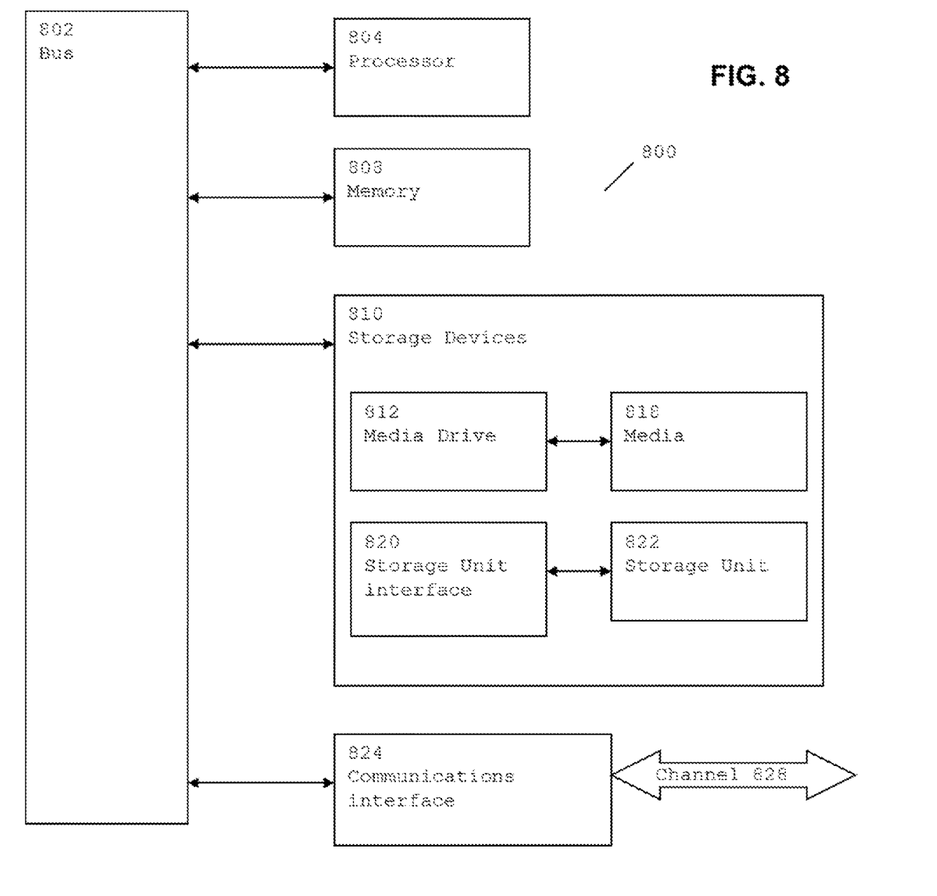
FIG. 8 illustrates a typical computing system that may be employed to implement data processing functionality in embodiments of the invention.

Referring now to FIG. 8, there is illustrated a typical computing system 800 that may be employed to implement data processing functionality in embodiments of the invention. For example, a computing system of this type may be used within the apparatus 300 of FIG. 3. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control module. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fibre optics, or other communications medium. Some examples of a channel include a phone line, a cellular phone link, an RF link, a network interface, a local or wide area network, and other communications channels.

In this document, the terms 'computer program product' computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g. libraries for performing standard functions) to do so.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.

In an embodiment where the elements are implemented using software, the software may be stored in a computer-readable medium and loaded into computing system 800 using, for example, removable storage drive 822, drive 812 or communications interface 824. The control module (in this example, software instructions or computer program code), when executed by the processor 804, causes the processor 804 to perform the functions of the invention as described herein.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors may be used without detracting from the invention. For example, functionality illustrated to be performed by the same processor or controller may be performed by separate processors or controllers. Hence, references to specific functional units are only to be seen as references to suitable means for providing the described functionality, rather than indicative of a strict logical or physical structure or organization.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims. Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method comprising:
   identifying, by a device, a set of subscriber call data records relating to vehicular calls;
   deriving, by the device, a physical channel measurement threshold value based on physical channel measurement values for the identified set of subscriber call data records,
     deriving the physical channel measurement threshold value including:
       determining whether a particular quantity of the physical channel measurement values is available;
       deriving, when the particular quantity of physical channel measurement values is not available, the physical channel measurement threshold value based on a theoretical physical channel measurement value; and
       deriving, when the particular quantity of physical channel measurement values is available, the physical channel measurement threshold value based on mean and standard deviation values for the physical channel measurement values; and
   classifying, by the device, subscriber call data records for a wireless communication network as indoor subscriber call data records or outdoor subscriber call data records based on a comparison of physical channel measurement values and the derived physical channel measurement threshold value.

2. The method of claim 1, further comprising:
   deriving location specific physical channel measurement threshold values based on the physical channel measurement values.

3. The method of claim 1, further comprising:
   deriving physical channel measurement threshold values for each of a plurality of area bins of a coverage area of the wireless communication network,
     each physical channel measurement threshold value being derived based on one or more physical channel measurement values, of the physical channel measurement values, within an area bin of the plurality of area bins.

4. The method of claim 1, further comprising:
   calculating the mean and standard deviation values.

5. The method of claim 1, further comprising:
   determining the theoretical physical channel measurement value based on a standard path-loss model.

6. The method of claim 1, further comprising:
   determining whether a subscriber call data record, of the set of subscriber call data records, relates to a vehicular call; and
   classifying, based on determining that the subscriber call data record relates to the vehicular call, the subscriber call data record as an outdoor subscriber call data record.

7. The method of claim 1, further comprising:
   classifying a subscriber call data record, of the set of subscriber call data records, as an outdoor call when the subscriber call data record does not relate to a vehicular call and a physical channel measurement value for the subscriber call data record exceeds the derived physical channel measurement threshold value.

8. The method of claim 1, further comprising:
   classifying a subscriber call data record, of the set of subscriber call data records, as an indoor call when the subscriber call data record does not relate to a vehicular call and the physical channel measurement value for the subscriber call data record does not exceed the derived physical channel measurement threshold value.

9. The method of claim 1, further comprising:
   determining whether a particular subscriber call data record, of the set of subscriber call data records, relates to a vehicular call by:
     retrieving one or more subscriber call data records for a wireless device associated with the particular subscriber call data record,
       the particular subscriber call data record including travel time window information;
     obtaining geolocation data for the one or more retrieved subscriber call data records;
     determining a distance traveled by the wireless device over a travel time window, associated with the travel time window information, based on the obtained geolocation data; and
     determining whether the particular subscriber call data record relates to the vehicular call based on the determined distance.

10. An apparatus comprising:
    a memory configured to store instructions; and
    a processor configured to execute the instructions to:
      identify a set of subscriber call data records relating to vehicular calls;
      derive a physical channel measurement threshold value based on physical channel measurement values for the identified set of subscriber call data records,
        the processor, when deriving the physical channel measurement threshold value, being configured to:
          calculate mean and standard deviation values for the physical channel measurement values; and derive the physical channel measurement threshold value based on the calculated mean and standard deviation values; and classify subscriber call data records for a wireless communication network as indoor subscriber call data records or outdoor subscriber call data records based on a comparison of physical channel measurement values and the derived physical channel measurement threshold value.

11. The apparatus of claim 10, where the processor is further configured to:

derive location specific physical channel measurement threshold values based on the physical channel measurement values.

12. The apparatus of claim 10, where the processor is further configured to:

derive physical channel measurement threshold values for each of a plurality of area bins of a coverage area of the wireless communication network, each physical channel measurement threshold value being derived based on one or more physical channel measurement values, of the physical channel measurement values, within an area bin of the plurality of area bins.

13. The apparatus of claim 10, where the processor, when deriving the physical channel measurement threshold value, is configured to:

determine whether a particular quantity of physical channel measurement values is available; and derive, when the particular quantity of physical channel measurement values is not available, the physical channel measurement threshold value based on a theoretical physical channel measurement value.

14. The apparatus of claim 13, where the processor is further configured to:

determine the theoretical physical channel measurement value based on a standard path-loss model.

15. The apparatus of claim 10, where the processor is further configured to:

determine whether a subscriber call data record, of the set of subscriber call data records, relates to a vehicular call; and classify, based on determining that the subscriber call data record relates to the vehicular call, the subscriber call data record as an outdoor subscriber call data record.

16. The apparatus of claim 10, where the processor is further configured to:

classify a subscriber call data record, of the set of subscriber call data records, as an outdoor call when the subscriber call data record does not relate to a vehicular call and a physical channel measurement value for the subscriber call data record exceeds the derived physical channel measurement threshold value.

17. The apparatus of claim 10, where the processor is further configured to:

classify a subscriber call data record, of the set of subscriber call data records, as an indoor call when the subscriber call data record does not relate to a vehicular call and the physical channel measurement value for the subscriber call data record does not exceed the derived physical channel measurement threshold value.

18. The apparatus of claim 10, where the processor is further configured to:

determine whether a particular subscriber call data record, of the set of subscriber call data records, relates to a vehicular call, the processor, when determining whether the particular subscriber call data record relates to the vehicular call, being configured to:

retrieve one or more subscriber call data records for a wireless device associated with the particular subscriber call data record, the particular subscriber call data record including travel time window information;

obtain geolocation data for the one or more retrieved subscriber call data records;

determine a distance traveled by the wireless device over a travel time window, associated with the travel time window information, based on the obtained geolocation data; and determine whether the particular subscriber call data record relates to the vehicular call based on the determined distance.

19. A non-transitory computer-readable medium storing instructions, the instructions comprising:

one or more instructions which, when executed by a processor of a device, cause the processor to:

identify a set of subscriber call data records relating to vehicular calls;

derive a physical channel measurement threshold value based on physical channel measurement values for the identified set of subscriber call data records, the one or more instructions to derive the physical channel measurement threshold value including:

one or more instructions to determine whether a particular quantity of the physical channel measurement values is available;

one or more instructions to derive, when the particular quantity of physical channel measurement values is not available, the physical channel measurement threshold value based on a theoretical physical channel measurement value; and one or more instructions to derive, when the particular quantity of physical channel measurement values is available, the physical channel measurement threshold value based on mean and standard deviation values for the physical channel measurement values; and classify subscriber call data records for a wireless communication network as indoor subscriber call data records or outdoor subscriber call data records based on a comparison of physical channel measurement values and the derived physical channel measurement threshold value.

20. The non-transitory computer-readable medium of claim 19, where the instructions further include:

one or more instructions to determine whether a particular subscriber call data record, of the set of subscriber call data records, relates to a vehicular call, the one or more instructions to determine whether the particular subscriber call data record relates to the vehicular call including:

one or more instructions to retrieve one or more subscriber call data records for a wireless device associated with the particular subscriber call data record, the particular subscriber call data record including travel time window information;

one or more instructions to obtain geolocation data for the one or more retrieved subscriber call data records;

one or more instructions to determine a distance traveled by the wireless device over a travel time window, associated with the travel time window information, based on the obtained geolocation data; and one or more instructions to determine whether the particular subscriber call data record relates to the vehicular call based on the determined distance.

\* \* \* \* \*